United States Patent [19]
Lewis

[11] Patent Number: 5,745,379
[45] Date of Patent: Apr. 28, 1998

[54] METHOD FOR THE PRODUCTION AND TRANSMISSION OF ENHANCED MULTIMEDIA INFORMATION

[75] Inventor: Scott W. Lewis, Saratoga, Calif.

[73] Assignee: Multimedia Systems Corporation, San Jose, Calif.

[21] Appl. No.: 700,131

[22] Filed: Aug. 20, 1996

Related U.S. Application Data

[63] Continuation of Ser. No. 369,279, Jan. 5, 1995, abandoned, which is a continuation of Ser. No. 976,941, Nov. 16, 1992, abandoned.

[51] Int. Cl.⁶ .................................................. G09G 5/00
[52] U.S. Cl. ...................... 364/514 A; 345/113; 395/114
[58] Field of Search .......................... 364/514 R, 514 A; 348/13, 16, 17; 370/82, 95.1, 109, 110.1, 469, 487; 395/114, 154, 155; 345/112, 113

[56] References Cited

U.S. PATENT DOCUMENTS

| | | | |
|---|---|---|---|
| 5,128,776 | 7/1992 | Scorse et al. | 358/426 |
| 5,231,484 | 7/1993 | Gonzales et al. | 358/133 |
| 5,243,428 | 9/1993 | Challapali et al. | 358/167 |
| 5,249,047 | 9/1993 | Aoki et al. | 358/135 |
| 5,251,209 | 10/1993 | Jurkevich et al. | 370/82 |
| 5,253,058 | 10/1993 | Gharavi | 358/135 X |
| 5,260,783 | 11/1993 | Dixit | 358/135 X |
| 5,262,964 | 11/1993 | Bonsall et al. | 364/514 |
| 5,268,846 | 12/1993 | Bonsall et al. | 364/514 |
| 5,414,469 | 5/1995 | Ganzales et al. | 348/408 |
| 5,426,513 | 6/1995 | Scorse et al. | 358/433 |

Primary Examiner—James P. Trammell
Assistant Examiner—Edward Pipala
Attorney, Agent, or Firm—Benman Collins & Sawyer

[57] ABSTRACT

An optimization method is disclosed that enhances the interactivity of multimedia information. The optimization method includes separating a multimedia information into primary and secondary layers and enhancing that information in the primary layers such that the perceived psychographic information quality is improved. This method has the advantage of providing compression and/or transmission algorithms to maximize enhancement of the multimedia information.

7 Claims, 7 Drawing Sheets

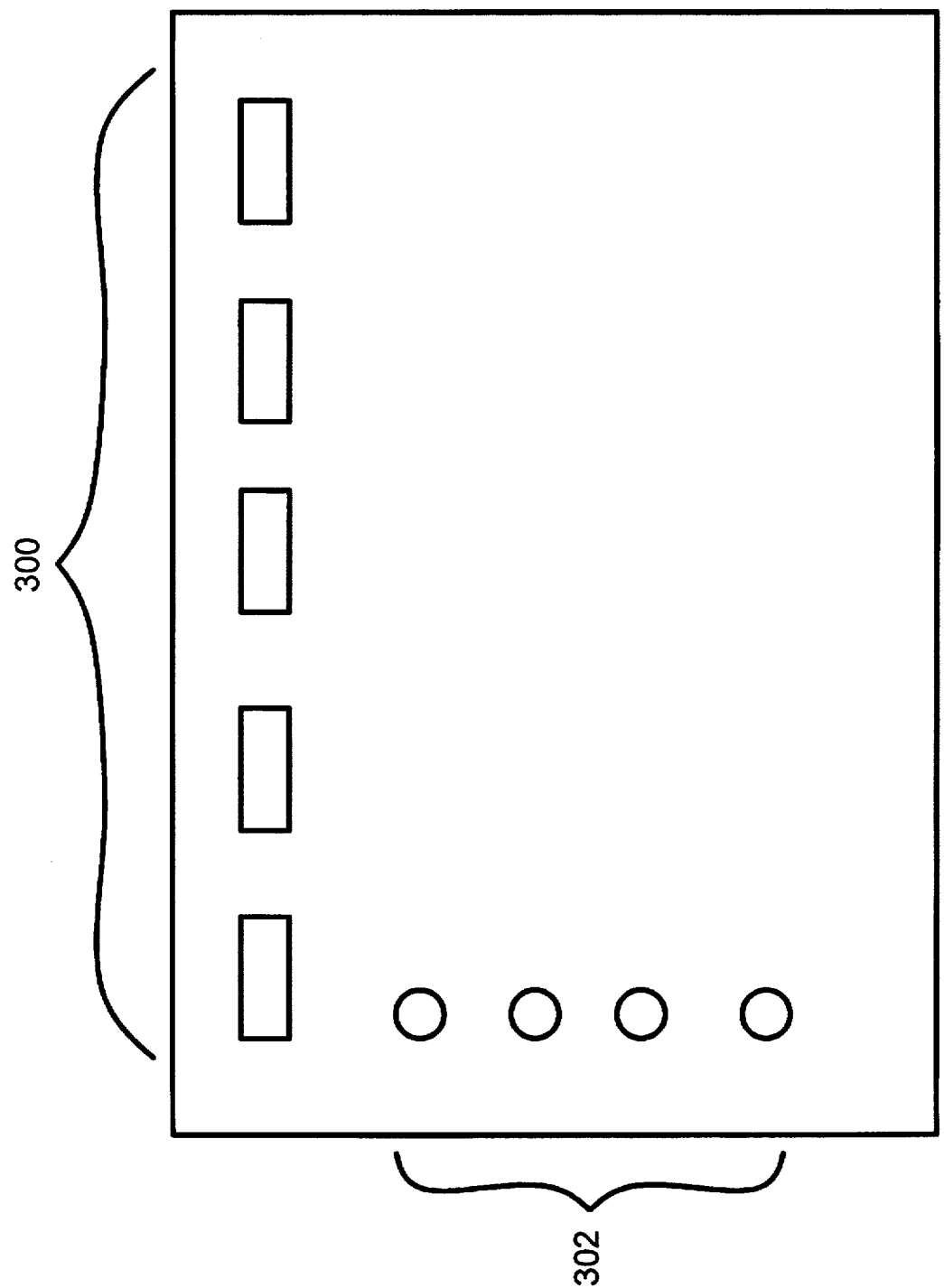

MIDI FILE

HEADER 10%

IMAGE FILE

HEADER 20%

METHOD FOR THE PRODUCTION AND TRANSMISSION OF ENHANCED MULTIMEDIA INFORMATION

This application is a continuation of application Ser. No. 08/369,279 filed Jan. 5, 1995, now abandoned, which is a continuation of Ser. No. 07/976,941 filed on Nov. 16, 1992, now abandoned.

FIELD OF THE INVENTION

The present invention relates to a method and system for the production, transmission and reception of multimedia information and more particularly to the production, transmission and reception of multimedia information with enhanced interactivity.

BACKGROUND OF THE INVENTION

Multimedia information is transmitted in a variety of applications over a network. What is meant by multimedia information is information that has several parameters which can be enhanced or diminished depending upon the importance of the particular information being conveyed. For example, in a video environment there may be foreground and background information that is to be provided to a screen. The screen can typically be a video screen or a computer screen. The most common example of that type of system is a interactive video system such as seen on cable television networks (ie, QVC or Home Shopping Network). These types of systems allow for a viewer to look at the screen and pick the type of product that he/she may want based on reviewing the information on the screen and then calling a particular telephone number to purchase the product.

Multimedia information can also be audio information in which news, weather, music and like could be transmitted with the use of background information such as white noise, background music or other information to complete the transmission. Multimedia information can also be a combination of graphics, video and music in an entertainment form such as Karaoke. As has been above mentioned, there are interactive systems presently available that allow for individuals to access certain video, audio, and graphics information on a network. All presently known systems have the problem of requiring a significant amount of bandwidth to allow for the quality transmission of the multimedia information.

It is known that multimedia information can require a significant amount of bandwidth. In the case of video information as much as 30 MB/sec. bandwidth is required to send a quality video image along a transmission path. In the case of audio information, as much as 10 MB/sec. bandwidth is required to allow for a stereo audio signal to be completely reproduced accurately.

What is meant by limited bandwidth can be viewed in two different ways. One way is to view the total available bandwidth at any instant in time. Another way of looking at bandwidth is by viewing it as the bandwidth available over a time period.

The available bandwidth therefor can be limited in two ways; first, the overall bandwidth of the network is limited such as in telephone networks where the bandwidth is approximately ten (10) kilohertz. However in this example, the available bandwidth over time could be very high because the telephone set is not utilized constantly.

On the other hand in looking at a wide bandwidth network such as cable television, most of the available bandwidth is utilized for providing the network signals. In such an example, the available bandwidth over time might be much less than the above-mentioned telephone system.

It is important to enhance interactivity of a multimedia information system to be able to adequately utilize the bandwidth of the network and to utilize the network in such a way to increase the quality of the transmission and reception of the multimedia information. It is also very important that the enhancement to multimedia system be one which can be adapted to existing networks with minimum modification and at the same time add minimal cost and expense to the multimedia system. Finally the enhancement should be one that can be easily implemented in the existing technologies and will serve to improve the overall performance of the interactive operation of a multimedia system.

SUMMARY OF THE INVENTION

An optimization method is disclosed for use in an interactive multimedia system for the separation and transmission of multimedia information. The optimization method comprises the steps of transmitting multimedia information; the multimedia information including multiple layers; and then separating the multiple layers of information into primary and secondary layers based upon a program model.

The method further comprises the steps of enhancing the primary layers through critical psychographic parameters in accordance with the program model, providing the secondary layers through alternate psychographic parameters, and combining the enhanced primary layers and the secondary layers to provide multimedia information that is a perceived improvement in quality. Through the use of this optimization method, a multimedia system can properly replicate multimedia information in a form that is as good a quality as the original information as perceived in the multimedia environment. The present invention utilizes compression and transmission algorithms to enhance the multimedia information and its interactivity. In addition error correction algorithms or the like can be utilized to further improve the information quality and enhance its interactivity.

BRIEF DESCRIPTION OF THE DRAWINGS

FIG. 6 is a chart showing the cooperation of a compression algorithm with a transmission algorithm in accordance with the present invention.

DETAILED DESCRIPTION OF THE INVENTION

The present invention relates to an improvement in the transmission and reception of multimedia information. The skill in the art to make and use the invention and is provided in the context of a patent application and its requirements. Various modifications to the preferred embodiment will be readily apparent to those skilled in the art and the generic principles defined herein may be applied to other embodiments. Thus, the present invention is not intended to be limited to the embodiment shown but is to be accorded the widest scope consistent with the principles and features described herein.

Figure 1:
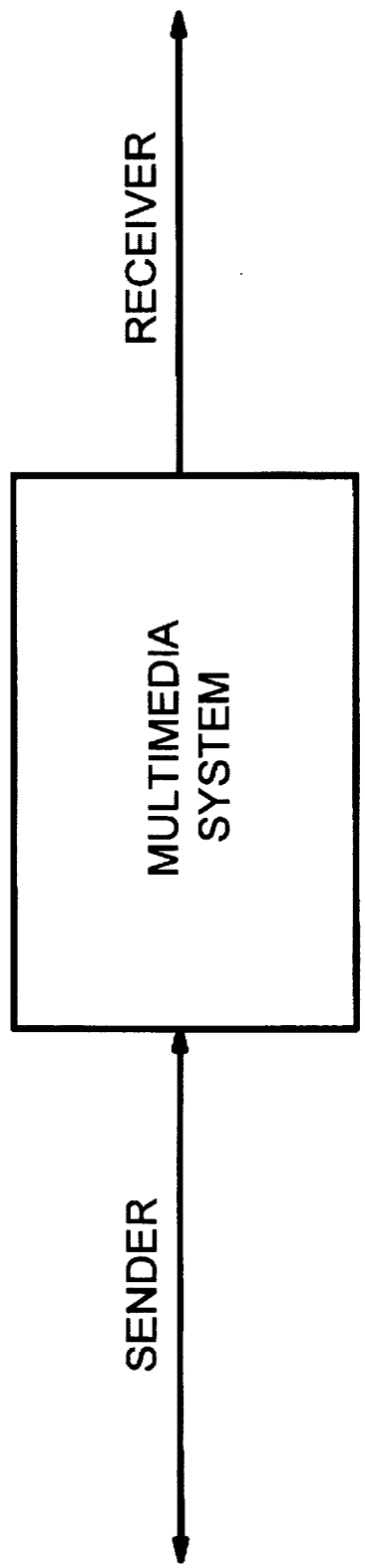
FIG. 1 is a block diagram of a prior art interactive multimedia system.

Referring now to FIG. 1, what is shown in simple block diagram form is a prior art interactive multimedia system 10. In such a system 10 a sender sends and receives information on one side of system 10 and the receiver sends and receives information on the other side of the system 10. The system 10 can be a single device such as a CD-ROM player or a network capable of fully interactive (2-way) multimedia transmission.

Before the present invention is described in detail certain background information should be discussed to clarify the utility of the present invention in terms of existing multimedia systems. In a multimedia system, various sensory information is provided to a receiver. In the case of video information, this information takes the form of foreground and background images that display a particular scene. In the case of audio information, the foreground and background signals are such that the foreground information is speech and the background information is music.

Typically, multimedia systems in whatever form provide this information over a single transmission line. In so doing, the amount and quality of the multimedia system is severely limited by the bandwidth of the transmission line.

The present invention first differentiates between important and less important multimedia information by separating the information into primary and secondary layers through the use of a program model to minimize the bandwidth limitations. In such a system each layer will have its own set of parameters that are important to the use of the information, however, the secondary layer will not vary as much as the primary layer.

What is meant by program model refers to a description of the dynamics or parameters that are developed from the point of view of the program audience. The multimedia system should be one in which the program can be replicated from the program model scientifically as well as psychographically from the particular receiver's perspective. These parameters comprise a set of unique and consistent elements for a particular class of multimedia information.

In accordance with the present invention, the layer of multimedia information is separated into different layers or layers in accordance with the program model. Therefore, by way of example, in the instance of video images the foreground and background information may be divided into different layers. Similarly, in the case of audio information, the news information, weather information or the like may be one layer whereas the background music may be the other layer.

In the present invention these layers will be divided into primary and secondary layers in accordance with the information's importance relative to the program model. The most important information is identified and enhanced to provide the best quality information to the receiver of the multimedia information.

In the preferred embodiment, the primary layers will be enhanced in such a way to provide a perceived improvement in quality of the multimedia information presented. In one embodiment the secondary layers are presented that may or may not be enhanced. Thereby the important information or the primary layers that are to be transmitted can be identified and selectively enhanced in accordance with the present invention.

In addition, the primary layers generally can be enhanced through critical psychographic parameters that are in accordance with the program model. The psychographic parameters take the form of spatial, color, audio, and temporal variables that occur in the primary or secondary layers.

The goal of the optimization system is to provide maximum interactivity while at the same time providing maximum retention of the program model. It is also important that there be minimum transit time for the interactivity while the information has maximum replication. Therefore, it is very important that the program model psychographic parameters be well described. For example, the spatial, color, temporal, audio response, material concept, content perception all should be very well described and defined in the program model.

Figure 2:
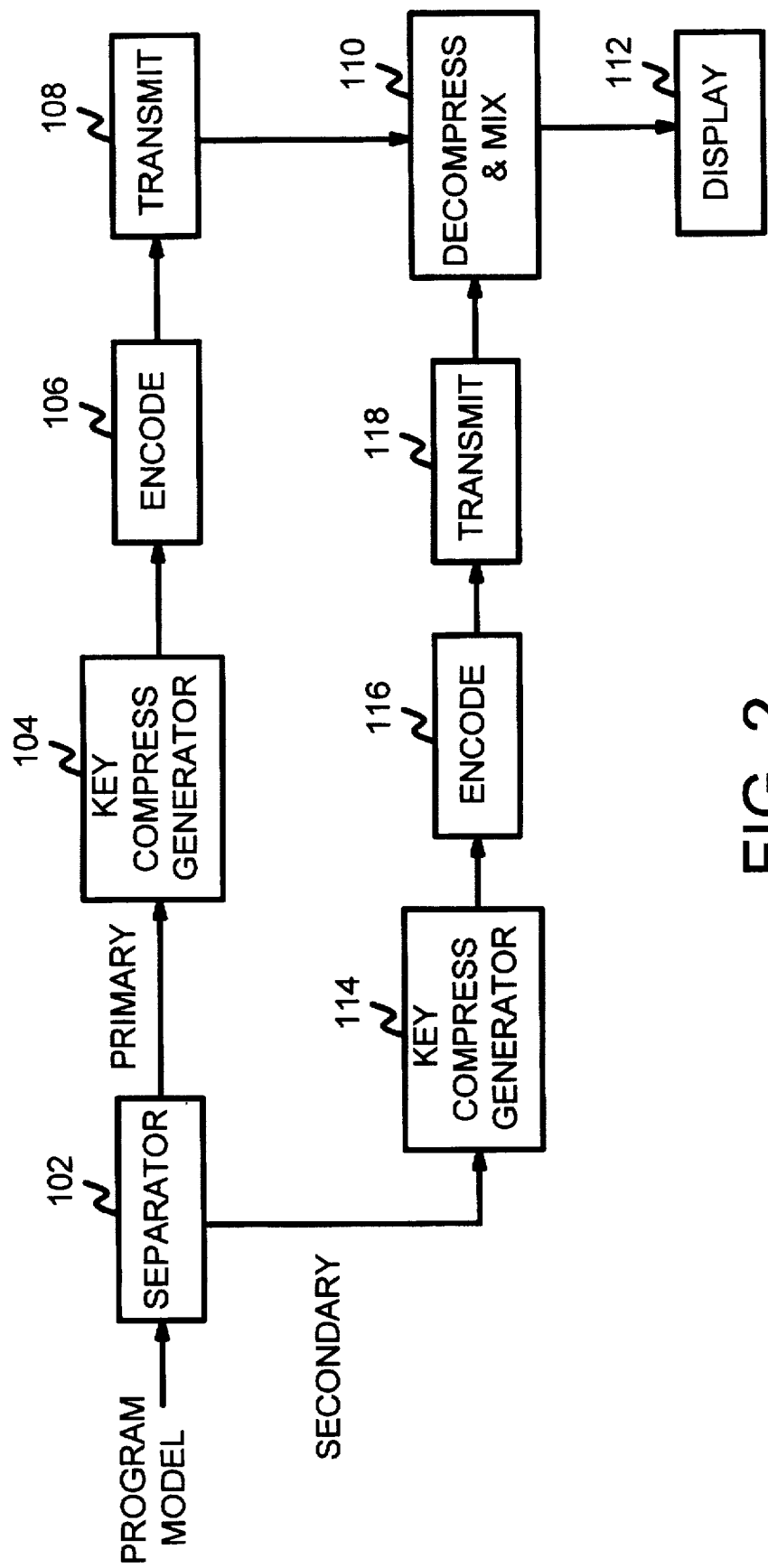
FIG. 2 is a flow chart of a first embodiment of the optimization method in accordance with the present invention.

Referring now to FIG. 2 what is shown is a first embodiment of a flow chart for providing an enhanced interactive image that utilizes the principles of the present invention. The flow chart 100 comprises the steps of providing a program model to a separator. The separator 102 will divide the information into primary and secondary layers of interactive multimedia information. The separation can be automatic or manual and can be accomplished in a variety of ways. For example, the layers can be separated by production sources. In another example, separation can be accomplished through color key coding (chroma keying) the layers. In yet a third example, the layers can be separated according to spatial or color variations. Finally, layers of information could be separated by a filtering process. (e.g. high frequency vs. low frequency multimedia information).

The rules for the separation between primary and secondary information are determined by both the relative importance of the information as indicated in the program model and by the variation of the information among the interactive selection pool; with commonality of information being weighted as secondary information. Therefore by way of example, the program material represented by a video image jewelry catalog could have as program model candidates for primary information the jewelry on a high quality jewelry stand. However since the jewelry stand is common among most or all of the jewelry the primary information would be the jewelry itself.

The primary layers are provided to the compression or generation or keying block 104. There are a variety of ways that the multimedia data can be changed or generated to use less bandwidth. For example, compression algorithms or their equivalents could be utilized to reduce the bandwidth used. In addition generators, such as in a tone generator system, could be utilized to reduce the bandwidth required. Finally key coding systems could be utilized to reduce bandwidth use. An example of key coding would be taking the before mentioned jewelry catalog example, if five different types of jewelry stands of primary program model importance were utilized each jewelry stand variation could be sent in advance across the network. The information could then be identified when required for recombination at the receiving end of the network by a unique key code. Such systems will be discussed in more detail later in the specification.

In this embodiment, the primary layers are provided to an encoder where the primary layers are prepared for transmission (block 108). As discussed later in this specification different compression, generation, and keying algorithms can be utilized for each layer in order to achieve the highest program model quality retention given the type of multimedia system (including the type or resolution of output devices) with maximum interactivity.

Figure 3:
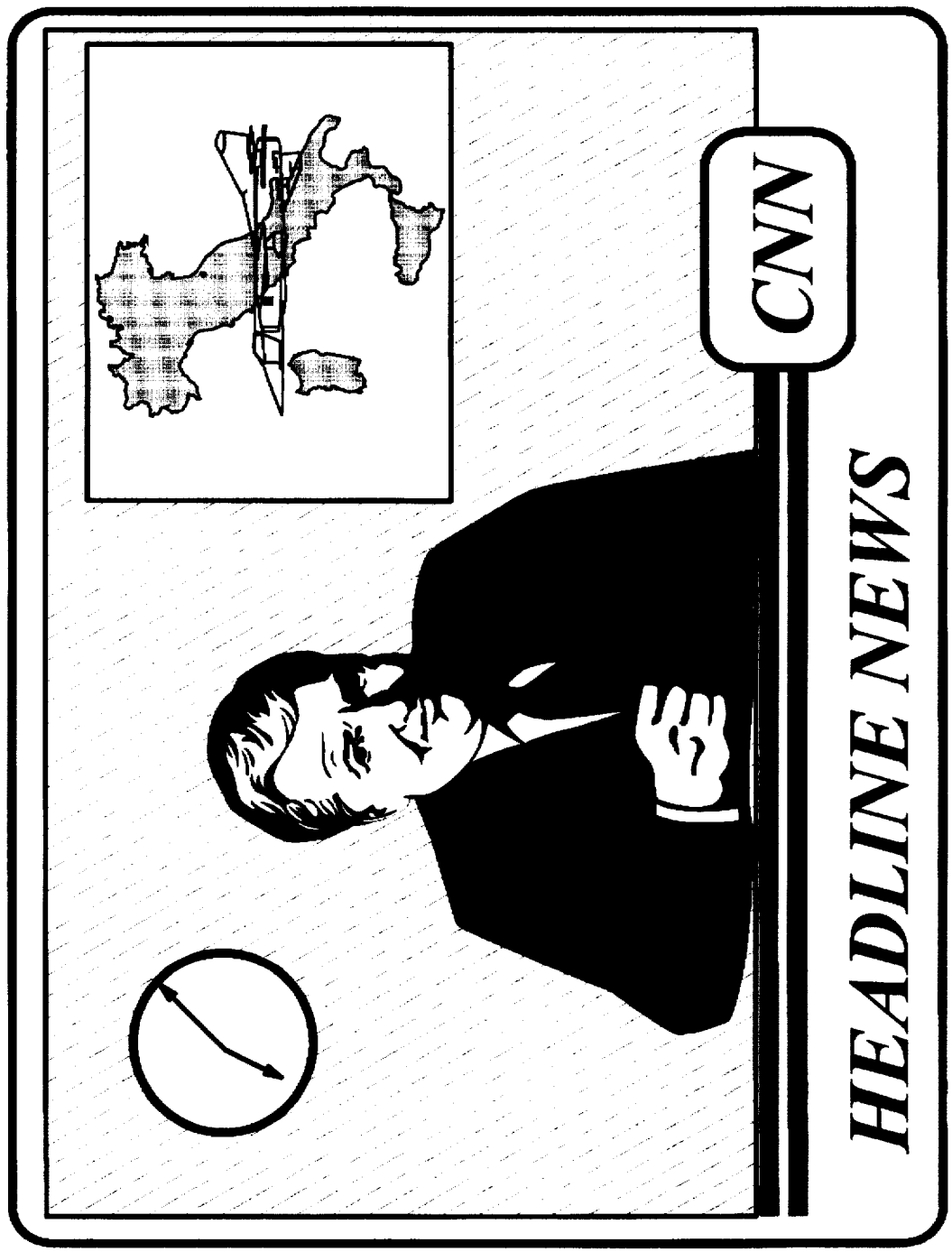
FIG. 3 is a representation of multimedia information in a cable news program.

Referring now to FIG. 3 what is shown is a depiction of a cable news program. The program model comprises primary layers representing the announcer with moderate motion, the high quality still picture in the right hand corner, the picture caption, and the speech of the announcer. The secondary layer comprises the television studio backdrop, the shading of the high quality picture, the newsroom logo and the background random sounds of typewriters and noise. In the primary layers, the announcer might be encoded by a particular motion algorithm (eg. CCITT H.261), and the high quality image by a JPEG image compression algorithm. On the other hand the picture caption could be generated by a character generator and the announcer speech by a PCM or ADPCM algorithm. Hence each of the these layers meeting the program model quality and interactivity objectives.

Referring back to FIG. 2, the primary layers are then decompressed (block 110) information. The primary layers are then decoded and mixed with the secondary layer of data information to provide an enhanced interactive multimedia wage (motion, video or other) or data to a display block 112.

Similarly, the secondary layers are compressed through block 114, encoded (block 116) and then transmitted to block 118 to decompress and mix block 110. The two signals (primary and secondary) are then sent to display 112.

In this embodiment, for example, in the optimization of video images, the primary layer can be the foreground image, the secondary layer can be background information. Through the use of this type of optimization technique multimedia information can be enhanced while at the same time utilizing significantly less bandwidth.

To more fully understand this feature refer now to the following discussion. In a typical interactive multimedia system the information is all sent along one layer. The information that can then be transmitted is limited by the bandwidth of that layer. In the prior art, the interactive multimedia information that could be transmitted along typical networks or transmission paths was very limited because, for example, in the case of video images the bandwidth is not adequate to provide a high quality image to a display.

Hence, in the present invention, by separating the multimedia information into primary and secondary layers and thereafter compressing the more important information utilizing well known compression algorithms, a system is described that can produce enhanced interactive multimedia information that can easily be transmitted over existing networks.

Figure 4:
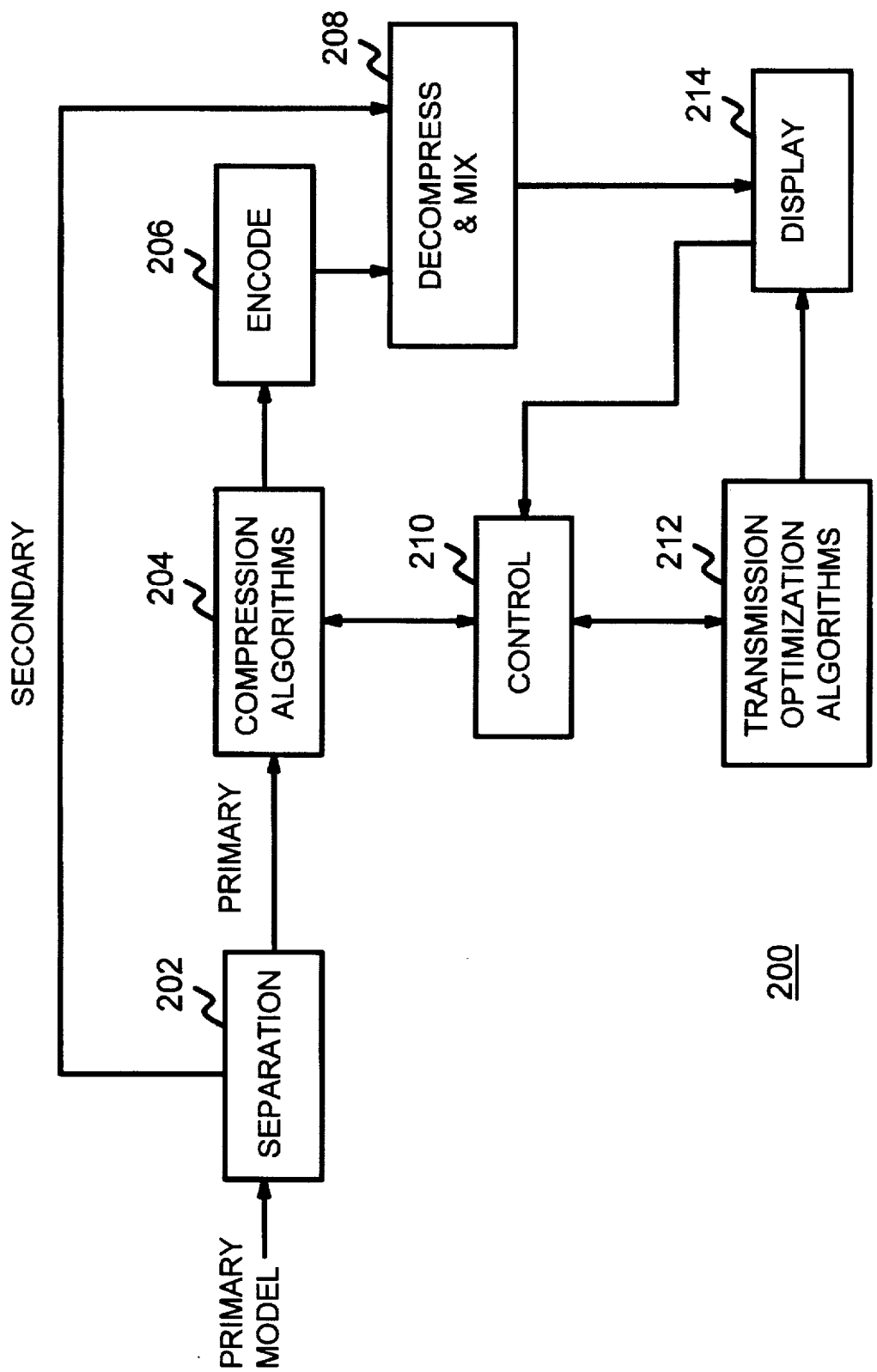
FIG. 4 is a flow chart showing the operation of a second embodiment of the optimization of enhanced interactive multimedia information in accordance with the present invention in which a matrix of compression and transmission algorithms are utilized.
Figure 5:
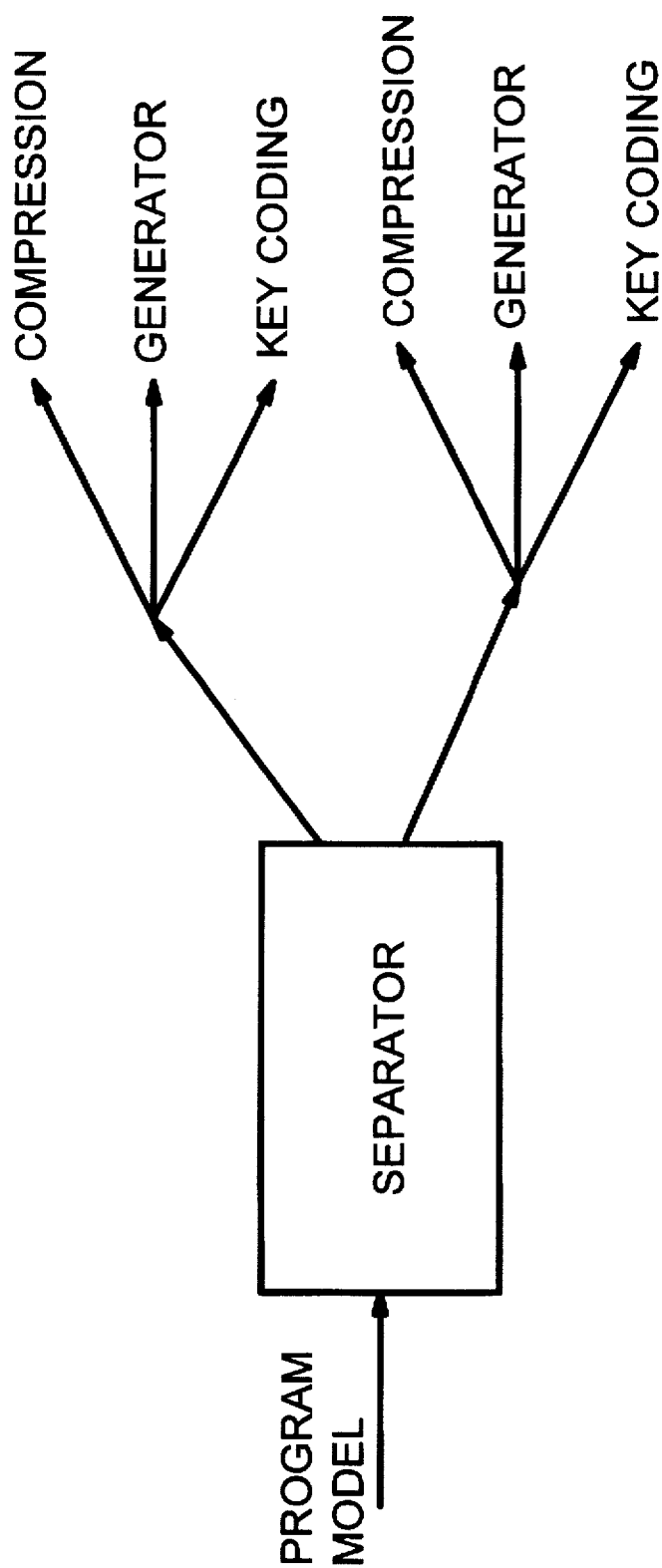
FIG. 5 is a flow chart showing the separation of multimedia information in accordance with the present invention.

To more fully describe the psychographic enhancement feature of the present invention refer now to FIG. 4 which shows a the various possibilities from a particular program model. The program model is provided to the separator 102 of the multimedia system.

Psychographic enhancements are critical to the improvement in interactive multimedia transmission and reception described by the present invention. What is meant by psychographic enhancements in the context of the present application is information that is not transmitted but operates on, operates in conjunction with, or operates as a supplement to transmitted multimedia information. There are four separate categories that will be described that relate to psychographic enhancements.

The first category will be described as an information enhancement due to the addition of information that is not transmitted. Dithering of image is an example of this in that dithering masks artifacts of images that are present and that improves the perceived image quality. This type of system does not remove the artifacts but actually just masks imperfections. A second example is the audio arena where secondary audio materials such as a sound of an ocean or the like which might mask problems in the audio quality of the primary sound (voice, music or the like).

The second category is where the signal is actually changed without the use of any control signal; for example, through interpolation or some other technique. The typical example of that is a graphic equalizer in which certain frequencies are enhanced depending on the range of the particular device. Another example of the second category is to frequency or amplitude compress a certain signal so as to further enhance the frequencies that are being transmitted. Another example is where an artifact location is identified prior to transmission of the signal and the area around the artifact is then filtered through interpolation or other techniques to remove the artifacts. It is also known to use various filters to sharpen or provide certain information that will actually modify the signal without controlling it per se.

A third category is using the primary and secondary information to drive the other generators that might be present within the multimedia system. This can be utilized to either enhance the multimedia information or enhance the program model. An example of this is the use of real-time graphics frequency spectrum displays to enhance a music juke box type of program model or the use of video (i.e., fades or wipes).

A fourth category is to use a correction signal or layer to eliminate particular critical errors or imperfections introduced during compression or transmission. In this instance the error correction signal or layer is transmitted in addition to the compressed signal or layer. An example of this type of category being where an artifact location is identified prior to transmission and a compressed error correction signal or layer for this region is also transmitted and then later decompressed and recombined with the associated signal or layer containing the determining error. This approach is applicable in cases where filtering of an artifact is insufficient and actual correction must be made because of the importance of the particular layer of multimedia information.

As is seen in FIG. 2, the primary multimedia information layer can be compressed to reduce the bandwidth utilizing well known algorithms. It is also seen that the signal can be replaced by a generator that is responsive to the primary/secondary layers signals. Finally, a key code could be used to cause information to be provided from a look-up table or the like.

Although all of the above methods provide advantages in accordance with the present invention, key coding has some additional non-obvious advantages when utilized in the optimization system of the present invention. In the following paragraphs, the use of various key coding systems will be described generally along with their attendant advantages.

Typically, when looking at an interactive multimedia information signal there are several components of that information. The first component is the data or the multimedia information itself that is being conveyed. The second component is referred to as program model dynamics. That is the changes that occur in the interactive multimedia information due to for example, a fade that allows for a transition from one scene in the graphics or video image to another. Conversely, if you want to wipe away a image there is information associated with the multimedia data that would call out for that transition to change efficiently.

Finally, the third component of interactive multimedia information is what will be referred to in this specification as the program model branching information. That is information which will allow a particular device or system to proceed from one scene or collection of branch information to another. In a typical interactive multimedia information system all this information is required to adequately transmit such information.

In its simplest form, a key has an identifiable code which dictates the commands on the other side of the network. The clearest example of such a keying system would the very simple dual tone multi-frequency (DTMF) signal. This type of signal can be used in the telecommunications area to provide keying for low bandwidth protocol. These keys would then command a code table on the side of the network to provide certain information about the multimedia information to be displayed without requiring actual transmission of the multimedia information.

A more specific version of this type of key coding is what will be referred to in this specification as control information keying. What is meant by controlled information keying is where a key code is utilized to access particular types of commands which can then be used to control other items on the other side of the network. In one, it would be possible to access a command table which relates to actions or certain parameters on the other side of the network. In another example, multimedia information can be accessed that is stored across a network. In this example, the multimedia information is critical to enhanced program model interactivity.

Such a table would then be utilized to access a certain set of multimedia information in the network. A final version of key coding will be called program branching keying is described by each of the keys representing a certain branch identification. Thus in this type of key coding the key is cross referenced to a particular branch of the interactive multimedia program where each of the branches allows plurality of functions or commands to be accessed in order to replicate the program model.

An additional advantage inherent in key coding is what will be hereinafter be described as predictive branching. What is meant by predictive branching is transmitting information (audio or visual) when conveying other information up to the available bandwidth. For example, when proceeding from one image to another a background image such as a stored advertisement image will be displayed to mask the retrieval of the information. In addition, this technique can be utilized to send several branches of information in the instance where a first decision will naturally lead down certain branches. These techniques help improve psychographic perceptions as well as improve interactivity.

The important feature that is provided by all of these types of keying coding arrangements is that information already present on the network can be utilized. Therefore, the processing power inherent in the network, on the network through storage and other means can be utilized rather than the processing power within the optimization system itself to achieve the quality and interactivity of the program model.

It is also important to develop means to improve the transmission quality of the multimedia information, for example, the information may be transmitted utilizing a typical transmission algorithm such as CCITT v.32, or Bell 202 with standard communication file data transfer protocols. The interactive multimedia information could also utilize specialized protocols that are optimized for the particular interactive multimedia information that is to be transmitted. In so doing the algorithm for the compression algorithm can be interactively matrixed with the transmission algorithm to provide the highest quality information with the maximum interactivity with the minimum transmission line. Referring now to FIG. 4, what is shown is a flow chart that shows the cooperation of the transmission algorithm with the compression algorithm to produce a high quality multimedia image. A similar flow chart could be drawn to show the use of the present invention in the optimization of print, music and other multimedia information. The flow chart comprises providing a program model in which the primary and secondary layers are separated (block 202). The primary layer is compressed and encoded (blocks 204 and 206).

A control element (210) is utilized to control a compression matrix and a transmission matrix. These two matrixes comprise a plurality of compression algorithm and transmission algorithm respectively that are interactively controlled such that as the various algorithms are detected the quality of the multimedia information and the speed of the transmission are interactively determined.

The quality of the information could be determined manually or through the use of some control circuitry. It should be understood that these same matrix could also be used on the secondary layer. It was not shown or described for purposes of clarity and simplicity.

Referring now to FIG. 6 what is shown is a block representation of a matrix of compression or keying algorithm with transmission algorithm that could be utilized in accordance with the present invention. The circles 302 aligned in the vertical direction are the compression or keying algorithms. The rectangles 300 aligned in the horizontal direction are the transmission algorithms. For example the compression or keying algorithms could be Joint Photographic Expert Group (JPEG) a generator with Musical Instrumental Digital Interface (MIDI), and a key for a weather map background. Similarly, the transmission algorithms could be optimized for JPEG, data compression for MIDI, or DTMF for key transmission type algorithms.

To provide the highest quality multimedia information while at the same time utilizing minimum bandwidth the different algorithms can be selected in an iterative manner. Hence a first compression algorithm could be selected along with the first transmission algorithm. The multimedia information is reviewed either for image or audio quality then a second compression algorithm is selected. The multimedia information is reviewed and if the interactivity is not acceptable then a second transmission algorithm is selected. The quality of the information is reviewed. This process is repeated until the highest or desired quality multimedia information and interactivity speed are provided.

The multimedia information derived from the compression/keying/transmission algorithms can be analog or digital in nature. However, in a digital signal there are certain other advantages that can be taken to advantages that can be utilized in accordance with the optimization method.

It is known that digital data information is typically sent in a file which specifies certain parameters of that data and the data information itself and within the data information itself is information which may not change for a certain set of files. In the case of an image file, the header information may specify the dimensions, pixel depth, and certain other features of the particular image. This file may take up as much as twenty percent of the data file, conversely, in a file such as MIDI music file which comprise a plurality or a series of music notes, the header may include instrument information, related information and characteristics of that particular file. In both of the above mentioned examples, the header information may not change, through the use of the optimization method the amount of information may be significantly reduced over time.

Hence, in the case of the image file, the header could be sent first with no compression or with lossless data compression as the secondary file because it will always remain the same. The data file itself can then be compressed down to its smaller size.

Another method for enhancing the psychographic parameters is to provide some form of error detection and adjustment. As has been before mentioned the detection and adjustment can be accomplished via interpolation to eliminate the appearance of an error. An alternative method of error correction is through an error correction/transmission algorithm.

In this type of system before the file is sent the base file is compressed and then decompressed. This decompressed file is called an expanded compressed base file. The expanded compressed base file is then compared to the original base file and an error file is then developed (the error file being the difference between or a function of the base file and the expanded compressed base file.) The error file is compressed and sent along with the compressed version of the base file down the line. Because the error file will have a higher frequency component than the base file, compression using standard methods will be typically more efficient. These files are then combined and decompressed after transmission to provide an enhanced image.

Figure 7B:
FIGS. 7a and 7b is a block representation of digital information of an image file and a MIDI file.
Figure 7A:
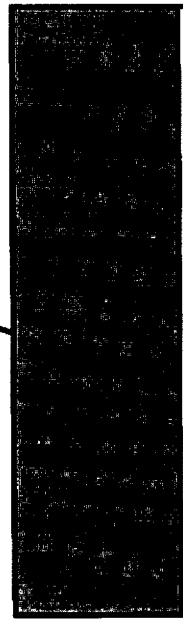

Referring now to FIGS. 7a and 7b it is seen that a data file utilizing this technique could initially be separated into primary and secondary layers. The primary layer could be compressed using a first compression algorithm, the header could be sent first along a first transmission path and the compression signal could be sent along second transmission path.

Therefore, the amount of storage necessary for the file is significantly reduced through secondary compression techniques. This information can then be transmitted or stored across the network rather than having to have all that information stored within a particular device within the optimization system.

It should be understood by one of ordinary skill in the art that the number of algorithms is not limited to the number shown in the figures. In addition it should be recognized that the order or the selection of the algorithms could be changed and that would be within the spirit and scope of the present invention.

The present invention has been discussed in terms of compressing the primary layer or layers and by compressing and transmitting that primary layer in a particular way the interactivity of the system is enhanced. It should be understood that it may be equally important to enhance secondary layers to produce the same effect.

Therefore, it may be important to enhance the secondary layer, it may be important to enhance the primary layer or it may be important to enhance both. Therefore, the present invention through the use of compression and transmission algorithms and through the psychographic enhancement of the program model can enhance interactivity of a multimedia system.

It should also be understood that the function of the compression and transmission algorithms can also be done through other means; for example, a signal generator could be used to provide the same information. That is, a signal generator responsive to a particular layer or layer of information could be utilized to provide that information or some level of information that is representative of that layer. For example, a tone generator could be utilized responses to a certain signal from the secondary layer to provide the tone that would be representative of that secondary layer.

Conversely, some type of graphic generator could be utilized to respond to that same type of signal to provide a certain type of graphic image in a video system. Finally, it should also be understood that the psychographic parameters can be adjusted by a human operator or in the alternative can be adjusted or modified by an automatic means.

Although the present invention has been described in accordance with the embodiments shown in the figures, one of ordinary skill in the art recognizes there could be variations to the embodiments and those variations would be within the spirit and scope of the present invention. Accordingly, many modifications may be made by one of ordinary skill in the art without departing from the spirit and scope of the present invention, the scope of which is defined solely by the appended claims.

I claim:

1. A method for the production and transmission of interactive multimedia information comprising the steps of:

(a) separating the interactive multimedia information based upon a program model into primary and secondary layers;

(b) compressing at least one of the primary and secondary layers;

(c) encoding the compressed at least one of the primary and secondary layers;

(d) transmitting the compressed and encoded at least one of the primary and secondary layers;

(e) transmitting the other of the primary and secondary layers;

(f) receiving the at least one and the other of the primary and secondary layers;

(g) decompressing the compressed and encoded at least one of the primary and secondary layers;

(h) mixing the decompressed at least one of the primary and secondary layers with the other of the primary and secondary layers in accordance with psychographic parameters, the psychographic parameters comprising spatial color, audio, and temporal parameters; and (i) displaying the decompressed at least one of the primary and secondary layers and the other of the primary and secondary layers to provide enhanced interactive multimedia data to a display.

2. The method of claim 1 in which step (b) further comprises the steps of:

(b1) compressing the primary layer, in accordance with a first compression algorithm; and (b2) compressing the secondary layer in accordance with a second compression algorithm.

3. The method of claim 2 in which step (c) further comprises the steps of:

(c1) encoding the compressed primary layer; and (c2) encoding the compressed secondary layer.

4. The method of claim 3 in which step (d) further comprises the steps of:

(d1) transmitting the compressed and encoded primary layers; and (d2) transmitting the compressed and encoded secondary layer.

5. The method of claim 4 in which step (e) further comprises the steps of:

(e1) decompressing the compressed and encoded primary layer and (e2) decompressing the compressed and encoded secondary layer.

6. The method of claim 5 in step (f) comprising the step of mixing the decompressed primary layer with the decompressed secondary layer.

7. A method for the production and transmission of interactive multimedia information comprising the steps of:

(a) separating the interactive multimedia information into primary and secondary layers based upon a program model;

(b) compressing the primary layer in accordance with a compression algorithm;

(c) encoding the compressed primary layer;

(d) transmitting the compressed primary layer and the secondary layer;

(f) decompressing the compressed and encoded primary and secondary layers;

(e) receiving the decompressed primary layer and the secondary layer;

(g) mixing the decompressed primary and the secondary layer in accordance with psychographic parameters, the psychographic parameters comprising spatial, color, audio, and temporal parameters, (h) displaying the decompressed primary layer and the secondary layer;

(i) controlling the compressing of the primary layer in accordance with a plurality of compression algorithms; and (j) controlling the displaying of the decompressed primary layer and the secondary layer in accordance with a plurality of transmission algorithms to provide enhanced interactive multimedia data to a display.

\* \* \* \* \*